US012632110B2

(12) United States Patent　　　　(10) Patent No.:　US 12,632,110 B2

Maxwell et al.　　　　　　　　　　(45) Date of Patent:　May 19, 2026

(54) METHOD AND TACTICAL PASSIVE RFID TRANSPONDER GLOVES WITH MORPHOLOGICAL ACTUATION

(71) Applicant: Georgia Tech Research Corporation, Atlanta, GA (US)

(72) Inventors: Erick Niels Maxwell, Lithia Springs, GA (US); Eres David, Atlanta, GA (US); Steven Paul Eicholtz, Atlanta, GA (US); Samuel Finlayson, Atlanta, GA (US); Dean Fullerton, Atlanta, GA (US); John Kealy, Atlanta, GA (US); Cameron Lewis, Atlantag, GA (US); Michael Matthews, Atlanta, GA (US); Dante Gabriel Orlando, Atlanta, GA (US); Jacqueline Ramirez-Medina, Atlanta, GA (US); Jonathan Ridley, Atlanta, GA (US); Kelden Robinson, Atlanta, GA (US); Rudra Pratap Singh, Atlanta, GA (US); Daniel Andrew Terrell, Atlanta, GA (US); Samrin Zaman, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 19/029,888

(22) Filed: Jan. 17, 2025

(65) Prior Publication Data

US 2025/0165071 A1　　May 22, 2025

Related U.S. Application Data

(63) Continuation of application No. 18/219,191, filed on Jul. 7, 2023, now Pat. No. 12,229,339.

(60) Provisional application No. 63/390,087, filed on Jul. 18, 2022.

(51) Int. Cl.
　　*G06F 3/01*　　(2006.01)
　　*G06K 7/10*　　(2006.01)
　　*G06Q 10/087*　　(2023.01)

(52) U.S. Cl.
　　CPC ......... *G06F 3/014* (2013.01); *G06K 7/10336* (2013.01); *G06Q 10/087* (2013.01)

(58) Field of Classification Search
　　CPC ... G06F 3/014; G06K 7/10336; G06Q 10/087
　　USPC ........................................................ 345/156
　　See application file for complete search history.

(56) References Cited

U.S. PATENT DOCUMENTS

| | | | |
|---|---|---|---|
| 7,034,685 B2 | 4/2006 | Fabre et al. | |
| 9,842,288 B1 * | 12/2017 | DeBates | G06K 7/10366 |
| 9,900,061 B1 * | 2/2018 | Lui | G06K 7/10009 |
| 2005/0223818 A1 * | 10/2005 | DeConde | G06V 40/1329 |
| | | | 73/862.042 |
| 2006/0273907 A1 | 12/2006 | Heiman et al. | |

(Continued)

*Primary Examiner* — Mark Edwards

(74) *Attorney, Agent, or Firm* — Meunier Carlin & Curfman LLC

(57) ABSTRACT

Disclosed herein are an exemplary apparatus, system, and methods (e.g., Tactical Passive RFID transponder gloves with Morphological Actuation) comprising a glove made predominately of a resistive fabric that varies resistance per degree of deformation; comprising near field communication RFID tag readers, and a controller coupled to the glove to evaluate the varied resistance. A method of classifying RFID tags is also disclosed.

18 Claims, 3 Drawing Sheets

(56)     References Cited

U.S. PATENT DOCUMENTS

2007/0289379 A1*   12/2007   You ......................... G01L 1/205
                                                     702/41
2008/0006696 A1      1/2008   Piersol et al.
2010/0097195 A1      4/2010   Majoros et al.
2011/0227700 A1      9/2011   Hamerly et al.
2012/0130563 A1      5/2012   McBain
2013/0288761 A1*   10/2013   Santos Paiva Ferraz
                                  Conceicao .............. A63F 13/00
                                                     463/7
2014/0266621 A1      9/2014   Jones et al.
2016/0054798 A1*     2/2016   Messingher ............ G06F 3/014
                                                     345/156
2016/0210483 A1      7/2016   Glaser
2016/0313801 A1*   10/2016   Wagner ................... G06F 1/163
2017/0296363 A1*   10/2017   Yetkin ..................... A61F 2/583
2018/0241255 A1*     8/2018   Leabman ................. H04B 1/04
2021/0373663 A1*   12/2021   Matusik ................... D04B 1/28

* cited by examiner

RFID ANTENNA ELEMENT

STRAIN SENSOR

ELECTRONICS

EXOSKELETON

METHOD AND TACTICAL PASSIVE RFID TRANSPONDER GLOVES WITH MORPHOLOGICAL ACTUATION

RELATED APPLICATION

This U.S. patent application claims priority to, and the benefit of, U.S. provisional application, U.S. 63/390,087, filed on Jul. 18, 2022, entitled "Tactical Passive RFID Transponder Gloves with Morphological Actuation," which is hereby incorporated by reference herein in its entirety.

BACKGROUND

Combat arms units of the U.S. Armed Forces are challenged to track the number of rounds available for mission execution in real-time. This includes knowing what is supplied, on-hand, fired, and ultimately re-supply needs. The status associated with the rounds for vehicles must include supplying information to central command to support operational decision making. The process can be quite involved.

Similarly, there are benefits to tracking in real-time packages and package handling sub-operations in warehouses and distribution centers.

While packages can be equipped with communication devices, e.g., RFID, to track specific packages, there is an associated cost for each tag and for the resources to place them on a package.

There is a benefit to improving the tracking of objects through their handling.

SUMMARY

An exemplary apparatus, system, and methods are disclosed (e.g., Tactical Passive RFID transponder gloves with Morphological Actuation) comprising a glove made predominately of a resistive fabric that varies resistance per degree of deformation; and a controller coupled to the glove to evaluate the varied resistance.

The apparatus (e.g., tactical passive RFID transponder gloves with morphological actuation) can provide an integrated solution for inventory management and includes battery management and reduced power consumption. It may also incorporate a material that supports comfort, mobility and ruggedness, enables user identification and actuates power based on the morphological position of the hand, which altogether organically enables tracking as a natural extension of inventory handling.

In an aspect, an apparatus (e.g., Tactical Passive RFID transponder gloves with Morphological Actuation) is disclosed comprising a glove comprising two or more force sensors, wherein the force sensors measure resistance; an RFID reader (e.g., configured to receive modulated backscatter from an RFID tag); and a controller coupled to the glove to evaluate the resistance.

In some embodiments, the apparatus further includes one or more antennas configured to nominally operate at 125 KHz-134 KHz, 13.56 MHz, or 850 MHz-960 MHz or 2.45-5.8 GHz frequencies.

In some embodiments, the apparatus further includes a passive antenna element woven into a palm region of the glove. In other embodiments, the passive antenna element may be woven into one or more appendages region of the glove, or a front-facing or back-facing side of the glove, or any other location on the glove which may encounter an RFID tag.

In some embodiments, the passive antenna element comprises a flexible material (e.g., conductive epoxy, 2-layer Polyimide-based Flex PCB, Mylar or Melinex polyester (PET) films, any thermoplastic made from ethylene glycol and dimethyl terephthalate (DMT), or woven conductive fabric (Velostat, Liqstat, copper+nickel-plated polyester)).

In some embodiments, the RFID reader is a near field communication RFID reader.

In some embodiments, the controller is configured to disable transmission based on glove morphology.

In some embodiments, the controller includes an integrated switch.

In some embodiments, the apparatus further includes a fingerprint scanner (e.g., configured to resolve operational ambiguity with the added benefit of identifying the wearer of the gloves).

In some embodiments, one of the at least two or more force sensors is integrated onto a palm of the glove and at least one of the two or more force sensors is along at least one appendage of the exoskeleton.

In some embodiments, the at least two force sensors are mesh-based sensors, mylar film sensors, or thin cable-shaped sensors.

In some embodiments, the controller is configured to disable the RFID (e.g., when an item is not being lifted or based on the morphological position of the hand).

In another aspect, a system is disclosed comprising the above-discussed apparatus.

In some embodiments, the system further includes a second apparatus so as to form a set (e.g. second-hand glove, forming a set of gloves).

In some embodiments, the system further includes an external interface configured to permit transfer of status and tag data (wherein the external includes Bluetooth, Bluetooth-LE, Wif-Fi, IEEE 802.15.4-Based Technologies (Thread, Zigbee), Z-Wave, Cellular low-Power WAN Technologies (NB-IOT, LTE-M), or Non-Cellular Low-power WAN technologies (LoRaWAN, Sigfox)).

In some embodiments, the status and tag data are sent to an inventory management system.

In some embodiments, the system management system is a military ammunition management system.

In some embodiments, the status and tag data are sent to another apparatus of claims 1-10 (e.g., exchange of data from one person to another via gloves).

In another aspect, a non-transitory computer readable medium is disclosed having instructions stored thereon, wherein execution of the instructions by a processor causes the processor to perform operation for any one of the above-discussed apparatus.

In some embodiments, the computer readable medium further includes instructions to classify force sensor readings and to tally RFID tag readings.

In some embodiments, the instructions to classify force sensor readings are one or more machine learning algorithms with predefined classifications.

DETAILED DESCRIPTION

Figure 1:
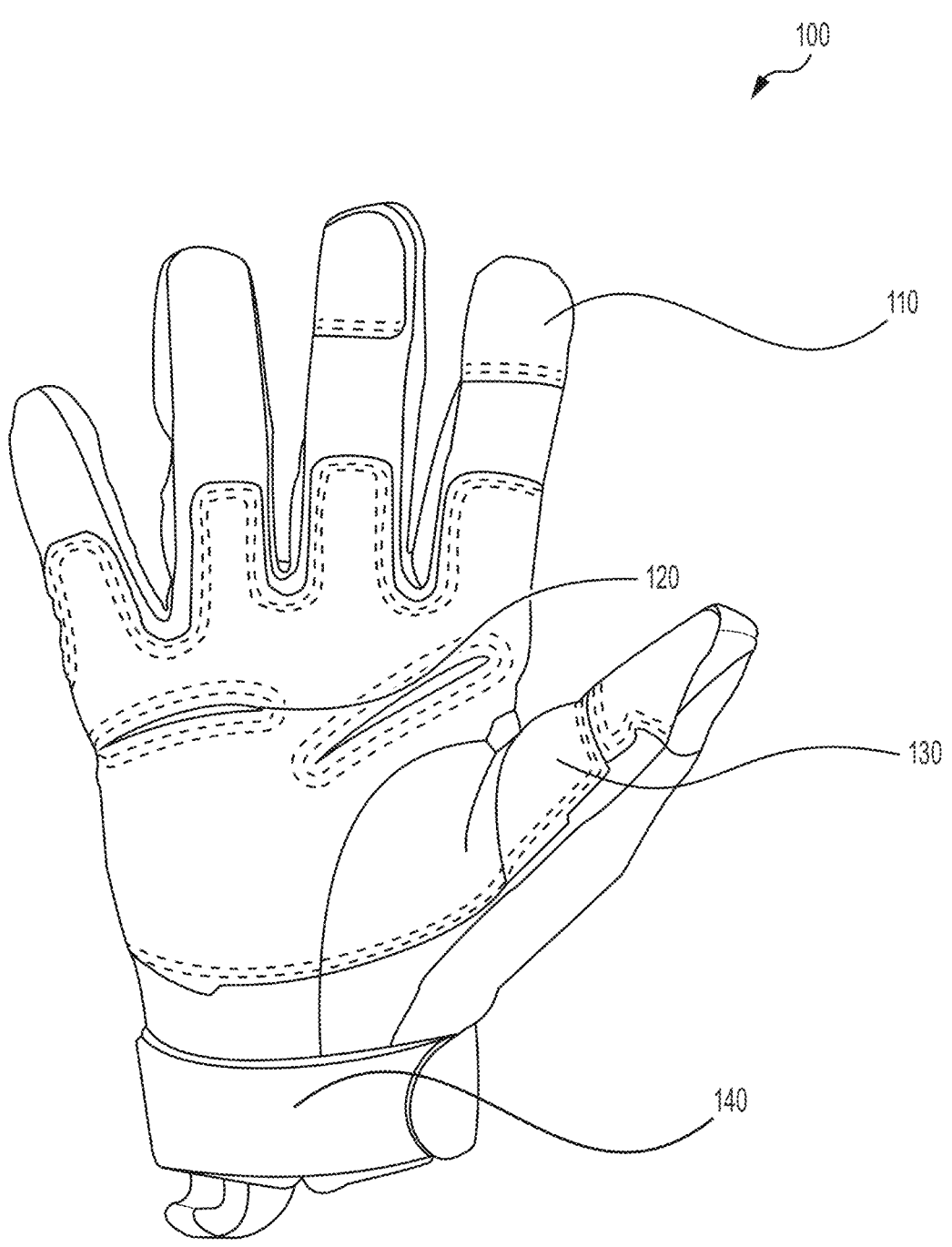
FIG. 1 shows a Tactical Passive RFID transponder glove with morphological actuation.

The following offers a solution to tracking inventory in real-time, with applications in domains such as tracking rounds of ammunition in real-time and other pertinent information regarding soldier engagement and such as inventory management in warehouse settings or fire-arm safety. The disclosed apparatus and system circumvent challenges associated with fixed RFID systems by incorporating force actuated sensors.

In preferred implementations of the system, a computer implemented method is configured to identify discrete morphological changes in the gloves that relate to specific movements performed during interaction with an inventory object.

In one example, the gloves are worn by an engaged soldier, whose actions during duty may include loading ammunition into ballistic devices or unloading ammunition from storage. The two actions would result in different morphological force sensor readings in an action sequence that can be classified by the related computer implemented method. The action sequence used by an engaged soldier may be repetitive and predictable, therefore, the action sequence for a classified action (e.g. loading ammunition, unloading ammunition from storage), can be encoded in the computer implemented method. The gloves may have independently actuated left- and right-handed force sensors and RIFD tag readers, so that the complexity of the recorded (by force sensors) action sequence matches real time movements. The RFID tags are placed to interact with the gloves during handling of the inventory object. The computer implemented method may additionally tally the number of inventory objects handled in a classified action sequence by the engaged soldier via reading an RFID tag of an inventory object together with the action sequence classification, in this example, an inventory object would be ammunition.

Other examples include use of the glove system in a warehouse setting where a worker may wear the gloves to track packages and classify the discrete actions in completing tasks related to package inventory. The glove 100 as shown in FIG. 1 comprises: a fingerprint reader 110, RFID antenna element 120, piezo-resistive fabric 130, and RFID reader and interface electronics 140.

In the example shown in FIG. 1, the glove system includes a 30-300 KHz, 3-30 MHZ, 300-1000 MHz, or 3-30 GHz antenna that nominally operates at the 125 KHz-134 KHz, 13.56 MHz, 850 MHz-960 MHz, or 2.45-5.8 GHz frequencies.

Figure 2:
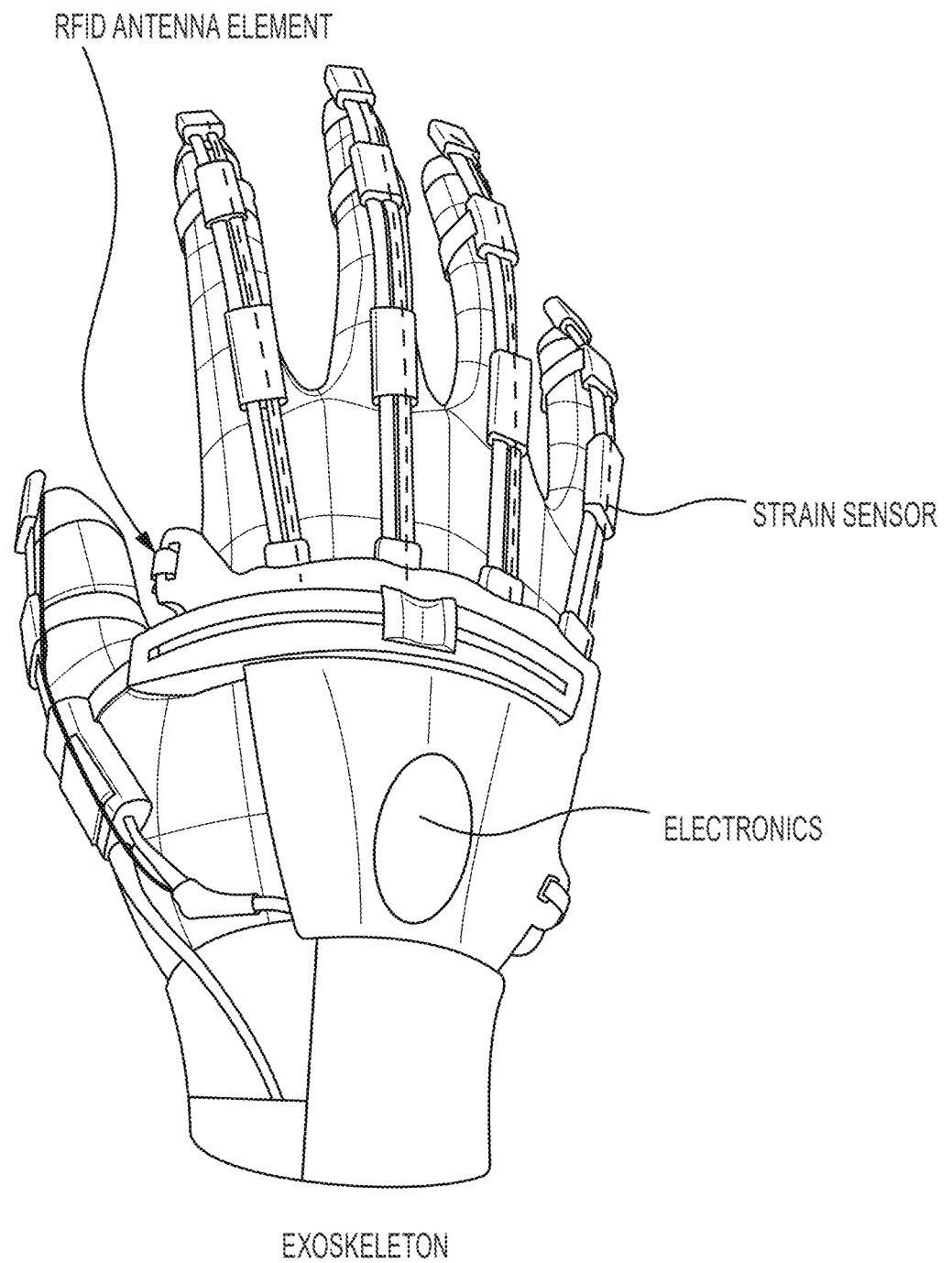
FIG. 2 shows a Tactical Passive RFID transponder glove exoskeleton with strain sensors along appendages.

The glove system may include a passive antenna element 120 that is woven into the palm or fingers of the glove. Alternatively or additionally, a solid antenna component may be integrated into an exoskeleton as shown in FIG. 2

The glove system may include a passive antenna element 120 that is constructed from flexible materials, including: conductive epoxy, 2-layer Polyimide-based Flex PCB, Mylar or Melinex polyester (PET) films, any thermoplastic made from ethylene glycol and dimethyl terephthalate (DMT), or woven conductive fabric (Velostat, Liqstat, copper+nickel-plated polyester).

When choosing the material for the components, consideration is given to those materials which easily dissipate heat so that the gloves do not overheat.

The glove system may include an RFID reader that is capable of receiving modulated backscatter from an RFID tag, and may nominally include a transmitter, baseband processor, receiver, and circulator. In some examples the RFID tag is a Near Field Communications (NFC) RFID. In one example, the NFC RFID tags are affixed to discrete objects (e.g. boxes, ammunition rounds, guns, anything that needs to be accounted for).

The glove system may include an external interface 140 that permits transfer of status and tag data, to include but not limited to: Bluetooth, Bluetooth-LE, Wif-Fi, IEEE 802.15.4-Based Technologies (Thread, Zigbee), Z-Wave, Cellular low-Power WAN Technologies (NB-IOT, LTE-M), or Non-Cellular Low-power WAN technologies (LoRaWAN, Sigfox).

The glove system may include a resistive fabric 130 that may be configured to quantify the degree of deformation.

The glove system may include an integrated switch that can disable transmission based on glove morphology.

The glove system may include a fingerprint scanner 110 configured to resolve operational ambiguity with the added benefit of identifying the wearer of the gloves.

FIG. 2 shows an exoskeleton of the glove system, which may include two or more force sensors for supporting action sequence determination. In some examples, at least one force sensor is provided along at least one appendage of the glove and one force sensor is provided on the palm of the glove. In another example, five force sensors are provided along five appendages of the exoskeleton and one force sensor is on the palm of the glove. The force sensors may be constructed out of resistive fabric or cable-wise sensors.

The number and placement of force sensors along appendages and on the palm of the glove may be adapted for the type of handling that will be performed during inventory-related tasks.

The glove system may be configured to turn the RFID off, e.g., when an item is not being lifted or on based on the morphological position of the hand.

The glove system may include a software program that utilizes the force sensor and resistive fabric to determine the morphological configuration of the hand in order to decide what action is being performed in relation to an RFID tagged object as well as to determine if the RFID should be switched-off.

Figure 3:
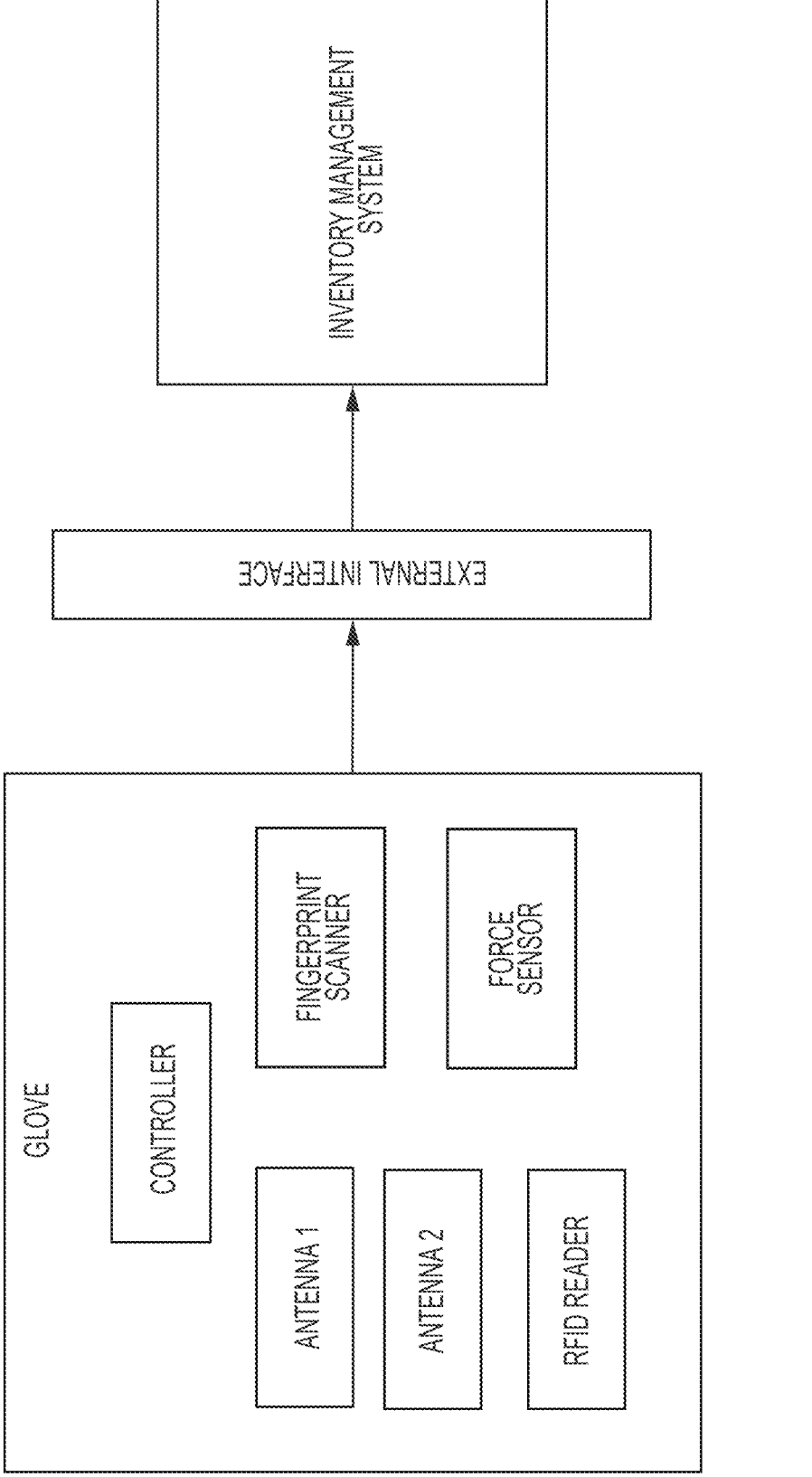
FIG. 3 shows a schematic of the glove components and the direction of communication with an inventory management system.

An example of the glove system is shown in FIG. 3. The glove, comprising a controller, a first antenna, a second antenna, RFID reader (can be near-field), fingerprint scanner and force sensor communicates via an external interface to an inventory management system.

Near Field Communications has three modes of operation. One of the modes is a communication form, when NFC one is called a slave and the other one is master, they can both be masters, or both be slaves, which allows for the transfer of data from one NFC device to another NFC device. In one example, the slave would be the glove and the master would be a controller plugged into an inventory management device. The transfer of data from a glove, a first, slave NFC device, to an inventory management system would be executed by touching a second, master NFC device, such as a touchpad, that will transfer the data into the inventory management system. In some implementations, the inventory management system will update upon transfer of new data or at strategic moments. In another embodiment, a second, master NFC device, which does not have a physical connection with the inventory management system, may be strategically placed in an area of operation for transfer of data from a glove to the second, master NFC device. It is contemplated that the second, master NFC device may be a second NFC-RFID glove, wherein the mode of sending and receiving can be changed from a first, slave NFC RFID glove to a second, master NFC-RFID glove.

The computer implemented method is configured to receive force sensor readings and RFID tag readings and interpret the force sensor readings as action sequences to be classified (e.g. a predetermined set of classifiers). The computer implemented method may use one of known machine learning classification and prediction algorithms to classify a set of force sensor readings to a predefined set of action sequences. The computer implemented method may also receive a corresponding RFID tag reading with a set of force sensor readings. In some implementations, the computer implemented method provides instructions for receiving input (e.g. corresponding RFID tag reading with a set of force sensor readings) and instructions to output the received information, for example from one NFC-RFID glove to a second NFC-RFID device or from one NFC-RFID glove to an inventory management system.

Discussion.

Predicate devices may include a Garment incorporating antenna for identifying articles to be sorted (U.S. Pat. No. 7,034,685B2). There are several distinctions over U.S. Pat. No. 7,034,685B2. The antenna is not constructed of elements that will support comfort and dexterity. Also, that glove does not incorporate the technical elements to effectuate the technology. For one, there is no practical means for controlling battery life and power consumption; no practical use for tactical engagement, i.e. it does not incorporate ability to identify the user, no ability for morphological actuation for safe use, i.e. it still radiates with a closed fist or hand. The tactical passive RFID transponder gloves with morphological actuation provide an integrated solution to all of the above challenges, while incorporating system elements that makes it useful for round counting.

Example Computing System

The exemplary system and method may be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts, and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

The computer system is capable of executing the software components described herein for the exemplary method or systems. In an embodiment, the computing device may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device to provide the functionality of a number of servers that are not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or can be hired on an as-needed basis from a third-party provider. Some cloud computing environments may comprise cloud computing resources owned and operated by the enterprise as well as cloud computing resources hired and/or leased from a third-party provider.

In its most basic configuration, a computing device includes at least one processing unit and system memory. Depending on the exact configuration and type of computing device, system memory may be volatile (such as random-access memory (RAM), non-volatile (such as read-only memory (ROM), flash memory, etc.), or some combination of the two.

The processing unit may be a standard programmable processor that performs arithmetic and logic operations necessary for the operation of the computing device. While only one processing unit is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device may also include a bus or other communication mechanism for communicating information among various components of the computing device.

Computing devices may have additional features/functionality. For example, the computing device may include additional storage such as removable storage and non-removable storage including, but not limited to, magnetic or optical disks or tapes. Computing devices may also contain network connection(s) that allow the device to communicate with other devices, such as over the communication pathways described herein. The network connection(s) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing devices may also have input device(s) such as keyboards, keypads, switches, dials, mice, trackballs, touch screens, voice recognizers, card readers, paper tape readers, or other well-known input devices. Output device(s) such as printers, video monitors, liquid crystal displays (LCDs), touch screen displays, displays, speakers, etc., may also be included. The additional devices may be connected to the bus in order to facilitate the communication of data among the components of the computing device. All these devices are well known in the art and need not be discussed at length here.

The processing unit may be configured to execute program code encoded in tangible, computer-readable media. Tangible, computer-readable media refers to any media that is capable of providing data that causes the computing device (i.e., a machine) to operate in a particular fashion.

Various computer-readable media may be utilized to provide instructions to the processing unit for execution. Example tangible, computer-readable media may include but is not limited to volatile media, non-volatile media, removable media, and non-removable media implemented in any method or technology for storage of information such as computer-readable instructions, data structures, program modules, or other data. System memory, removable storage, and non-removable storage are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture to store and execute the software components presented herein. It also should be appreciated that the computer architecture may include other types of computing devices, including hand-held computers, embedded computer systems, personal digital assistants, and other types of computing devices known to those skilled in the art.

In an example implementation, the processing unit may execute program code stored in the system memory. For example, the bus may carry data to the system memory, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways, including inventory management and fire-arm safety.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used.

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications, as listed below and throughout this document, are hereby incorporated by reference in their entirety herein.

What is claimed:

1. An inventory management system comprising:
a processor; and
a memory having instructions stored thereon, wherein execution of the instructions causes the processor to:
receive, via an external interface, (i) an RFID tag reading of an inventory object and (ii) an action sequence classification from an apparatus, wherein the apparatus comprises (i) a glove comprising two or more force sensors configured to measure resistance, (ii) an RFID reader, (iii) one or more antennas, and (iv) a controller coupled to the glove to evaluate the resistance measured from the glove and to read and/or tally RFID tags, wherein the controller is configured to determine the action sequence classification based on the measured resistance; and generate and store a new field for an inventory database for an object identified by the RFID tag reading with an updated status associated with the action sequence classification and a position determined from the RFID tag reading, including an additional tally of the object, wherein the determination of the action sequence classification is performed by one or more machine learning classification and prediction algorithms configured to interpret the measured resistance, and other RFID readings, as action sequences for real-time movements of a person to be classified.

2. The inventory management system of claim 1, wherein the one or more antennas comprise a passive antenna element configured to be woven into a palm region, one or more appendages, or front-facing or back-facing side of the glove, wherein the passive antenna element comprises a flexible material.

3. The inventory management system of claim 1, wherein the one or more antennas are configured to nominally operate at 125 KHz-134 KHz, 13.56 MHz, or 850 MHz-960 MHz or 2.45-5.8 GHz frequencies.

4. The inventory management system of claim 1, wherein the two or more force sensors are mesh-based sensors, mylar film sensors, or thin cable-shaped sensors.

5. The inventory management system of claim 1, wherein one of the two or more force sensors is integrated into a palm of the glove, and at least one of the two or more force sensors is along at least one appendage of an exoskeleton.

6. The inventory management system of claim 1, wherein the external interface includes Bluetooth, Bluetooth-LE, Wi-Fi, IEEE 802.15.4-Based Technologies, Z-Wave, Cellular Low-Power WAN Technologies, or Non-Cellular Low-Power WAN Technologies.

7. The inventory management system of claim 1, wherein the controller is configured to disable transmission based on glove morphology.

8. The inventory management system of claim 1, wherein the controller includes an integrated switch.

9. A method comprising:

receiving, via an external interface, (i) an RFID tag reading of an inventory object and (ii) an action sequence classification from an apparatus, wherein the apparatus comprises (i) a glove comprising two or more force sensors configured to measure resistance, (ii) an RFID reader, (iii) one or more antennas, and (iv) a controller coupled to the glove to evaluate the resistance measured from the glove and to read and/or tally RFID tags, wherein the controller is configured to determine the action sequence classification based on the measured resistance; and generating and storing a new field for an inventory database for an object identified by the RFID tag reading with an updated status associated with the action sequence classification and a position determined from the RFID tag reading, including an additional tally of the object, wherein the determination of the action sequence classification is performed by one or more machine learning classification and prediction algorithms configured to interpret the measured resistance, and other RFID readings, as action sequences for real-time movements of a person to be classified.

10. The method of claim 9, wherein the one or more antennas comprise a passive antenna element configured to be woven into a palm region, one or more appendages, or front-facing or back-facing side of the glove, wherein the passive antenna element comprises a flexible material.

11. The method of claim 9, wherein the one or more antennas are configured to nominally operate at 125 KHz-134 KHz, 13.56 MHz, or 850 MHz-960 MHz or 2.45-5.8 GHz frequencies.

12. The method of claim 9, wherein the two or more force sensors are mesh-based sensors, mylar film sensors, or thin cable-shaped sensors.

13. The method of claim 9, wherein one of the two or more force sensors is integrated into a palm of the glove, and at least one of the two or more force sensors is along at least one appendage of an exoskeleton.

14. The method of claim 9, wherein the external interface includes Bluetooth, Bluetooth-LE, Wi-Fi, IEEE 802.15.4-Based Technologies, Z-Wave, Cellular Low-Power WAN Technologies, or Non-Cellular Low-Power WAN Technologies.

15. The method of claim 9, wherein the controller is configured to disable transmission based on glove morphology.

16. The method of claim 9, wherein the controller includes an integrated switch.

17. A non-transitory computer-readable medium having instructions stored thereon, wherein execution of the instructions by a processor causes the processor to:

receive, via an external interface, (i) an RFID tag reading of an inventory object and (ii) an action sequence classification from an apparatus, wherein the apparatus comprises (i) a glove comprising two or more force sensors configured to measure resistance, (ii) an RFID reader, (iii) one or more antennas, and (iv) a controller coupled to the glove to evaluate the resistance measured from the glove and to read and/or tally RFID tags, wherein the controller is configured to determine the action sequence classification based on the measured resistance; and generate and store a new field for an inventory database for an object identified by the RFID tag reading with an updated status associated with the action sequence classification and a position determined from the RFID tag reading, including an additional tally of the object, wherein the determination of the action sequence classification is performed by one or more machine learning classification and prediction algorithms configured to interpret the measured resistance, and other RFID readings, as action sequences for real-time movements of a person to be classified.

18. The non-transitory computer-readable medium of claim 17, wherein the one or more antennas comprise a passive antenna element configured to be woven into a palm region, one or more appendages, or front-facing or back-facing side of the glove, wherein the passive antenna element comprises a flexible material.

* * * * *